(12) United States Patent
Bartel et al.

(10) Patent No.: US 9,174,393 B2
(45) Date of Patent: Nov. 3, 2015

(54) THERMOPLASTIC COMPOSITE TUBULAR STRUCTURES AND METHODS OF FABRICATING THE SAME

(71) Applicant: The Boeing Company, Seal Beach, CA (US)

(72) Inventors: Aaron W. Bartel, Seattle, WA (US); Brett I. Lyons, St. Louis, MO (US); Jeffery L. Marcoe, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/650,139

(22) Filed: Oct. 12, 2012

(65) Prior Publication Data
US 2014/0102578 A1   Apr. 17, 2014

(51) Int. Cl.
*B29C 70/30* (2006.01)
*B29C 70/20* (2006.01)
(Continued)

(52) U.S. Cl.
CPC .............. *B29C 70/205* (2013.01); *B29C 33/52* (2013.01); *B29C 70/462* (2013.01); *F16L 9/128* (2013.01); *B29C 2035/0811* (2013.01)

(58) Field of Classification Search
CPC ...... B29C 70/32; B29C 53/824; B29C 53/56; B29C 53/585; B29C 53/60; B29C 44/16; B29C 70/205; B29C 70/462; B29C 70/865; B29C 53/84; B29C 47/0023; B29C 65/4376; D04C 1/06; D04C 3/00; D04C 3/40
USPC ......... 156/173, 187, 189, 184, 180, 218, 148, 156/393; 138/123
See application file for complete search history.

(56) References Cited

U.S. PATENT DOCUMENTS

| | | | | |
|---|---|---|---|---|
| 4,946,526 A | * | 8/1990 | Petty-Galis et al. | 156/155 |
| 4,983,240 A | * | 1/1991 | Orkin et al. | 156/148 |

(Continued)

FOREIGN PATENT DOCUMENTS

| | | |
|---|---|---|
| DE | 102011011577 A1 | 4/2012 |
| WO | WO 92/12847 A1 | 8/1992 |
| WO | WO 92/20503 A1 | 11/1992 |

OTHER PUBLICATIONS

PCT Notification of Transmittal of The International Search Report and The Written Opinion of the International Searching Authority for PCT Counterpart International Application No. PCT/US2013/058538, Applicant The Boeing Company, Mailed Dec. 5, 2013, 11 pages.

*Primary Examiner* — Jacob T Minskey
*Assistant Examiner* — Vishal I Patel

(57) ABSTRACT

A method of fabricating a thermoplastic composite tubular structure provides a mandrel of a soluble, expandable material. The method overbraids the mandrel with a continuous fiber thermoplastic composite material to form an overbraided mandrel. The method installs the overbraided mandrel into a matched tooling assembly. The method heats in a heating apparatus the matched tooling assembly with the installed overbraided mandrel at a specified heating profile in order to consolidate the thermoplastic composite material and form a thermoplastic composite tubular structure. The method cools the matched tooling assembly with the formed thermoplastic composite tubular structure at a specified cooling profile. The method removes the formed thermoplastic composite tubular structure from the matched tooling assembly. The method solubilizes the mandrel to permanently remove the mandrel from the formed thermoplastic composite tubular structure.

15 Claims, 10 Drawing Sheets

(51) Int. Cl.
   *B29C 70/46*   (2006.01)
   *B29C 33/52*   (2006.01)
   *F16L 9/128*   (2006.01)
   *B29C 35/08*   (2006.01)

(56) References Cited

U.S. PATENT DOCUMENTS

| | | | |
|---|---|---|---|
| 5,128,192 A | | 7/1992 | Narasaki |
| 5,176,868 A | * | 1/1993 | Davis .......................... 264/257 |
| 5,409,651 A | * | 4/1995 | Head ............................ 264/103 |
| 5,468,327 A | | 11/1995 | Pawlowicz et al. |
| 6,828,373 B2 | | 12/2004 | Artz et al. |
| 8,002,926 B2 | | 8/2011 | Graham |
| 2009/0014919 A1 | | 1/2009 | Rossfeldt et al. |
| 2010/0249303 A1 | | 9/2010 | Rossfeldt et al. |
| 2011/0000398 A1 | | 1/2011 | Wallen et al. |
| 2011/0281052 A1 | * | 11/2011 | Dewhirst ..................... 428/36.9 |
| 2011/0304067 A1 | | 12/2011 | Rossfeldt et al. |
| 2012/0228467 A1 | * | 9/2012 | Wallen et al. .................. 249/61 |

* cited by examiner

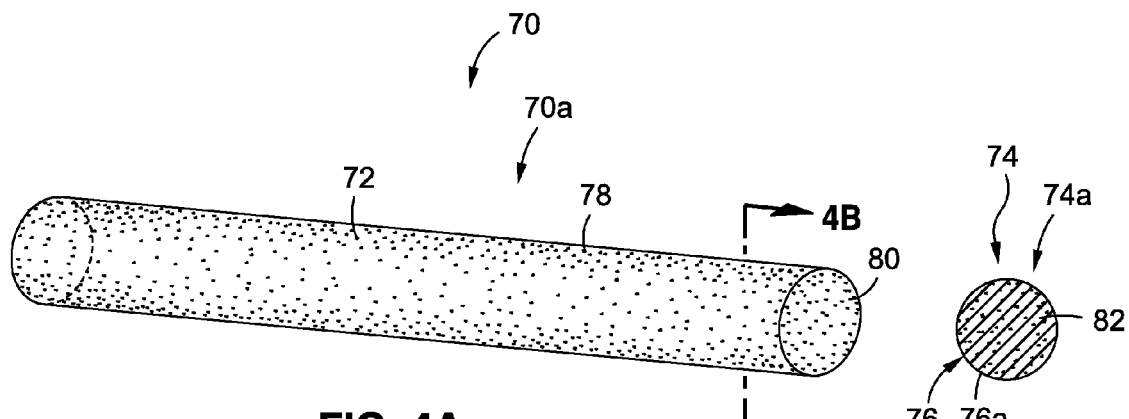
FIG. 4A
FIG. 4B
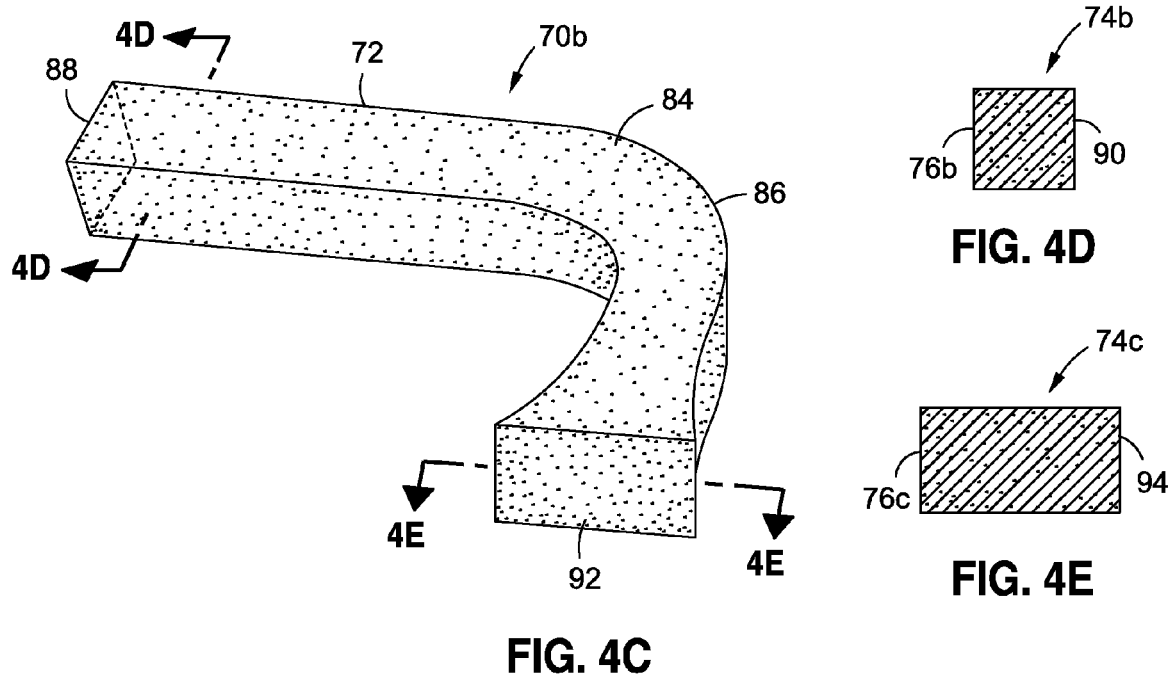
FIG. 4C
FIG. 4D
FIG. 4E

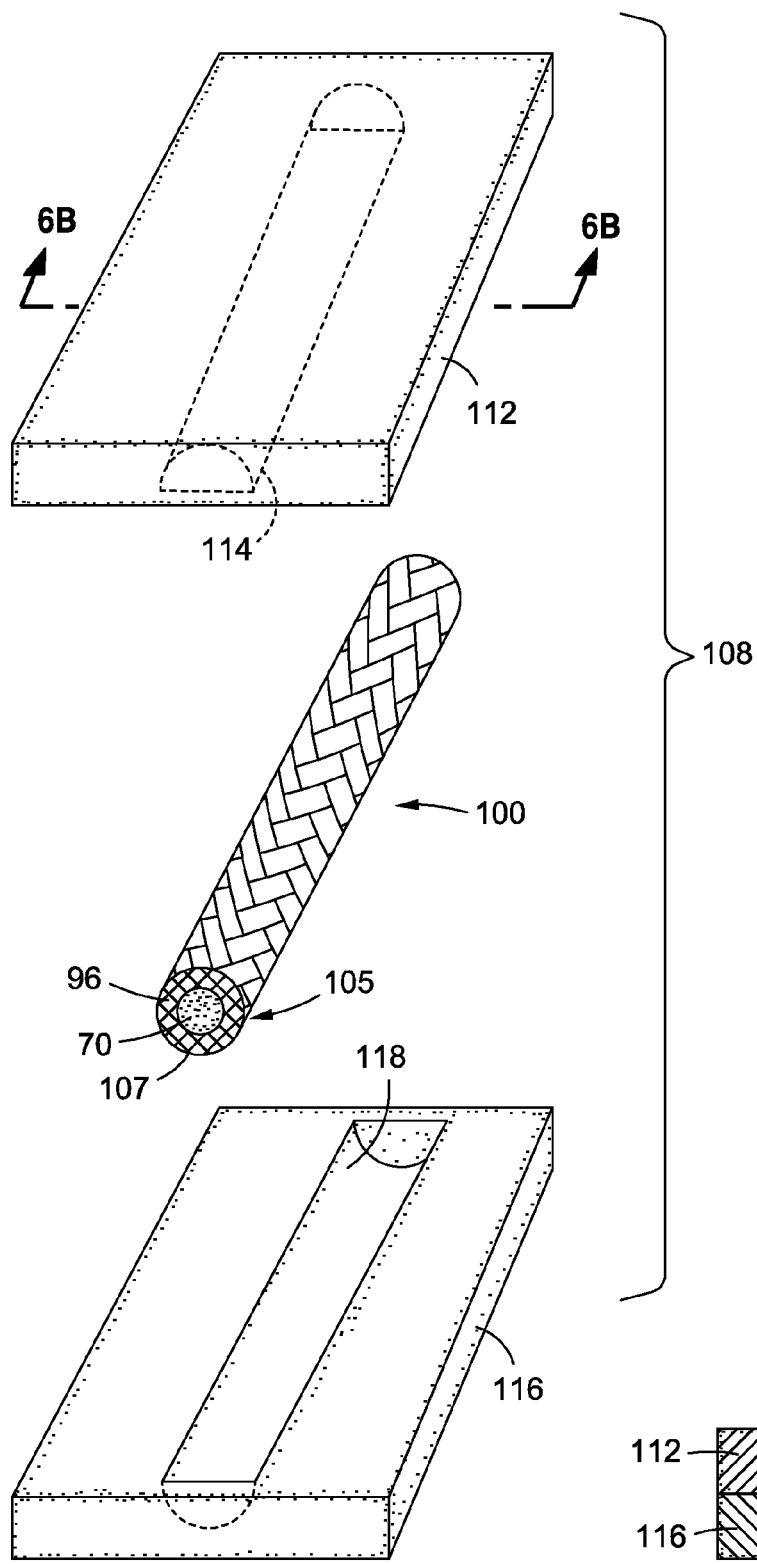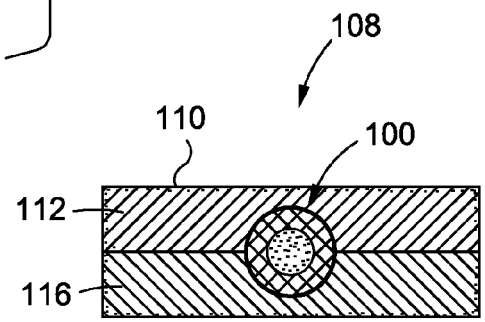
FIG. 6A  FIG. 6B

THERMOPLASTIC COMPOSITE TUBULAR STRUCTURES AND METHODS OF FABRICATING THE SAME

BACKGROUND

1) Field of the Disclosure

The disclosure relates generally to composite structures and methods of fabricating the same, and more particularly, to thermoplastic composite tubular structures and methods of fabricating the same using soluble, expandable tooling.

2) Description of Related Art

Thermoplastic and fiber-reinforced thermoplastic composite structures and parts are used in a wide variety of applications, including in the manufacture of aircraft, spacecraft, rotorcraft, watercraft, automobiles, trucks, and other vehicles and structures, due to their high strength-to-weight ratios, corrosion resistance, and other favorable properties. In aircraft manufacturing and assembly, such thermoplastic and fiber-reinforced thermoplastic composite structures and parts are used in increasing quantities to form the fuselage, wings, tail section, skin panels, and other components.

However, the use of thermoplastic composite materials in the design and manufacture of tubular cylindrical and non-cylindrical structures, such as tubes, pipes, ducts, conduits, and elongate hollow components, for use in aircraft, may be difficult due to tooling removal, processing temperature, outer surface dimensional tolerances, fiber alignment, and other processing challenges. Although known methods exist for fabricating tubular cylindrical and non-cylindrical structures, such known methods may use only resin without fiber reinforcement or may use very small fibers, e.g., millimeters long, that are not continuous, and which may be susceptible to decreased interface properties between the fiber and the matrix. Such decreased interface properties may limit the benefits available from higher strength continuous fibers or may result in thermoplastic composite structures that may be susceptible to fatigue.

In addition, known methods exist for fabricating tubular cylindrical and non-cylindrical structures from thermoset composite materials and from aluminum and titanium metal materials. However, the use of thermoset composite materials may require long cure cycles, e.g., 4 hours to 24 hours or more, due to the crosslinking that the thermoset composite materials undergo, and longer cure cycles may result in increased manufacturing time, and in turn, increased manufacturing costs. Further, the use of metal materials may result in increased weight of the aircraft, which, in turn, may result in increased fuel costs during aircraft flight. Moreover, the use of titanium metal materials may result in increased manufacturing costs due to the high cost of such titanium metal materials.

Accordingly, there is a need in the art for improved thermoplastic composite tubular structures and improved methods for fabricating such thermoplastic composite tubular structures that provide advantages over known structures and methods.

SUMMARY

This need for improved thermoplastic composite tubular structures and improved methods for fabricating such thermoplastic composite tubular structures is satisfied. As discussed in the below detailed description, embodiments of the improved thermoplastic composite tubular structures and improved methods for fabricating such thermoplastic composite tubular structures may provide significant advantages over existing structures and methods.

In an embodiment of the disclosure, there is provided a method of fabricating a thermoplastic composite structure. The method comprises providing a mandrel comprised of a soluble, expandable material. The mandrel has a mandrel cross-section defining a first closed geometric shape. The method further comprises overbraiding the mandrel with a continuous fiber thermoplastic composite material to form an overbraided mandrel. The overbraided mandrel has an overbraided mandrel cross-section defining a second closed geometric shape that corresponds to the first closed geometric shape of the mandrel cross-section. The method further comprises installing the overbraided mandrel into a matched tooling assembly. The method further comprises heating in a heating apparatus the matched tooling assembly with the installed overbraided mandrel at a specified heating profile in order to consolidate the continuous fiber thermoplastic composite material and form a thermoplastic composite tubular structure. The method further comprises cooling the matched tooling assembly with the formed thermoplastic composite tubular structure at a specified cooling profile. The method further comprises removing the formed thermoplastic composite tubular structure from the matched tooling assembly. The method further comprises solubilizing the mandrel to permanently remove the mandrel from the formed thermoplastic composite tubular structure. In another embodiment of the disclosure, there is provided a thermoplastic composite tubular structure formed by this method.

In another embodiment of the disclosure, there is provided a method of fabricating thermoplastic composite tubing. The method comprises providing a tubular mandrel comprised of a soluble, expandable ceramic material. The method further comprises using a braiding apparatus to overbraid the tubular mandrel with a continuous fiber thermoplastic composite material to form an overbraided mandrel. The method further comprises installing the overbraided mandrel into a clamshell metallic tooling assembly. The method further comprises heating in a heating apparatus the clamshell metallic tooling assembly with the installed overbraided mandrel at a specified heating profile in order to consolidate the continuous fiber thermoplastic composite material and expand the expandable ceramic material of the tubular mandrel outwardly to exert pressure on the continuous fiber thermoplastic composite material against the clamshell metallic tooling assembly causing consolidation and formation of a thermoplastic composite tube. The method further comprises cooling the clamshell metallic tooling assembly with the formed thermoplastic composite tube at a specified cooling profile. The method further comprises removing the formed thermoplastic composite tube from the clamshell metallic tooling assembly. The method further comprises washing out the tubular mandrel with water or a water-based solution to permanently remove the tubular mandrel from the formed thermoplastic composite tube. In another embodiment of the disclosure, there is provided a thermoplastic composite tube formed by this method.

In another embodiment of the disclosure, there is provided a method of fabricating an aircraft thermoplastic composite structure. The method comprises providing a mandrel comprised of a soluble, expandable material. The mandrel has a mandrel cross-section defining a first closed geometric shape. The method further comprises using a braiding apparatus to overbraid the mandrel with a continuous fiber thermoplastic composite material to form an overbraided mandrel. The method further comprises installing the overbraided mandrel into a matched tooling assembly. The overbraided mandrel has an overbraided mandrel cross-section defining a second closed geometric shape that corresponds to the first closed geometric shape of the mandrel cross-section. The method further comprises heating in a heating apparatus the matched tooling assembly with the installed overbraided mandrel at a specified heating profile in order to consolidate the continuous fiber thermoplastic composite material and expand the expandable material of the mandrel outwardly to exert pressure on the continuous fiber thermoplastic composite material against the matched tooling assembly causing consolidation and formation of a thermoplastic composite tubular structure. The method further comprises cooling the matched tooling assembly with the formed thermoplastic composite tubular structure at a specified cooling profile. The method further comprises removing the formed thermoplastic composite tubular structure from the matched tooling assembly. The method further comprises solubilizing the mandrel with water or a water-based solution to permanently remove the mandrel from the formed thermoplastic composite tubular structure. The method further comprises using the formed thermoplastic composite tubular structure with the mandrel removed in an aircraft. In another embodiment of the disclosure, there is provided an aircraft thermoplastic composite tubular structure fabricated by this method.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 4A is an illustration of a perspective view of one of the embodiments of a mandrel that may be used in method embodiments of the disclosure;

FIG. 4B is an illustration of a cross-sectional view taken along lines 4B-4B of FIG. 4A;

FIG. 4C is an illustration of a perspective view of another one of the embodiments of a mandrel that may be used in method embodiments of the disclosure;

FIG. 4D is an illustration of a cross-sectional view taken along lines 4D-4D of FIG. 4C;

FIG. 4E is an illustration of a cross-sectional view taken along lines 4E-4E of FIG. 4C;

FIG. 6A is an illustration of an exploded perspective view of an overbraided mandrel and a matched tooling assembly that may be used in method embodiments of the disclosure;

FIG. 6B is an illustration of a cross-sectional view taken along lines 6B-6B of FIG. 6A;

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 1:
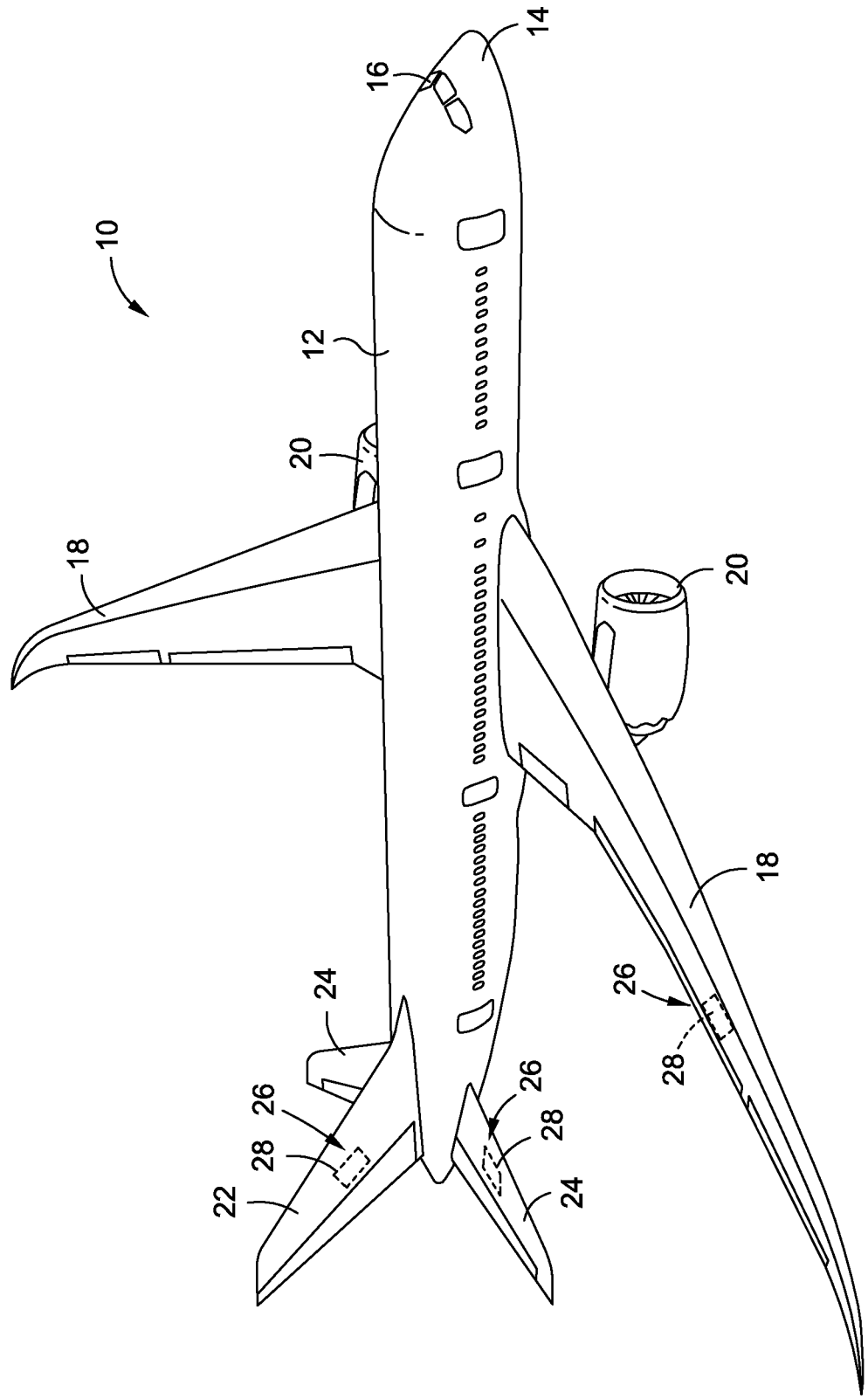
FIG. 1 is an illustration of a perspective view of an aircraft which may incorporate one or more thermoplastic composite tubular structures fabricated by one of the embodiments of a method of the disclosure.

Now referring to the Figures, FIG. 1 is an illustration of a perspective view of an aircraft 10 that may incorporate one or more thermoplastic composite tubular structures 26, such as an aircraft thermoplastic composite tubular structure 28, fabricated by one of the embodiments of a method 200 (see FIG. 9), a method 250 (see FIG. 10), or a method 300 (see FIG. 11) of the disclosure. As shown in FIG. 1, the aircraft 10 comprises a fuselage 12, a nose 14, a cockpit 16, wings 18 operatively coupled to the fuselage 12, one or more propulsion units 20, a tail vertical stabilizer 22, and one or more tail horizontal stabilizers 24. Although the aircraft 10 shown in FIG. 1 is generally representative of a commercial passenger aircraft, the one or more thermoplastic composite tubular structures 26, as disclosed herein, may also be employed in other types of aircraft or air vehicles. More specifically, the teachings of the disclosed embodiments may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles. It may also be appreciated that embodiments of structures and methods in accordance with the disclosure may be utilized in other transport vehicles, such as boats and other watercraft, trains, automobiles, trucks, buses, or other suitable transport vehicles formed from or utilizing thermoplastic composite tubular structures or parts.

Figure 2:
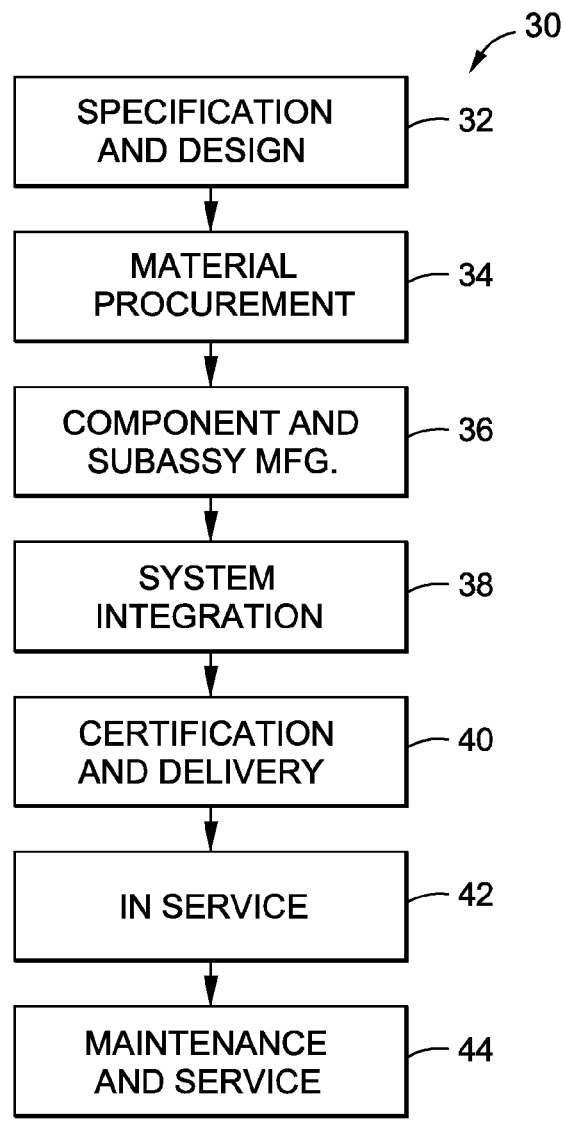
FIG. 2 is an illustration of a flow diagram of an embodiment of an aircraft manufacturing and service method of the disclosure.
Figure 3:
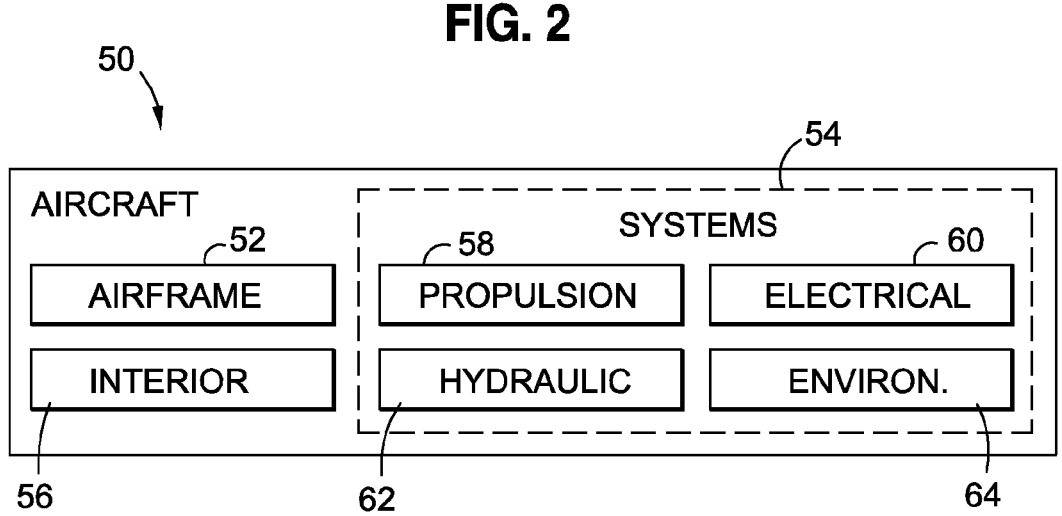
FIG. 3 is an illustration of a functional block diagram of an aircraft.

FIG. 2 is an illustration of a flow diagram of an embodiment of an aircraft manufacturing and service method 30 of the disclosure. FIG. 3 is an illustration of a functional block diagram of an aircraft 50. Referring to FIGS. 2-3, embodiments of the disclosure may be described in the context of the aircraft manufacturing and service method 30, as shown in FIG. 2, and the aircraft 50, as shown in FIG. 3. During pre-production, the exemplary aircraft manufacturing and service method 30 may include specification and design 32 of the aircraft 50 and material procurement 34. During production, component and subassembly manufacturing 36 and system integration 38 of the aircraft 50 takes place. Thereafter, the aircraft 50 may go through certification and delivery 40 in order to be placed in service 42. While in service 42 by a customer, the aircraft 50 is scheduled for routine maintenance and service 44 (which may also include modification, reconfiguration, refurbishment, and so on).

Each of the processes of the aircraft manufacturing and service method 30 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 3, the aircraft 50 produced by the exemplary aircraft manufacturing and service method 30 may include an airframe 52 with a plurality of high-level systems 54 and an interior 56. Examples of high-level systems 54 may include one or more of a propulsion system 58, an electrical system 60, a hydraulic system 62, and an environmental system 64. Any number of other systems may be included. Although an aerospace example is shown, the principles of the invention may be applied to other industries, such as the automotive industry.

Methods and structured embodied herein may be employed during any one or more of the stages of the aircraft manufacturing and service method 30. For example, components or subassemblies corresponding to component and subassembly manufacturing 36 may be fabricated or manufactured in a manner similar to components or subassemblies produced while the aircraft 50 is in service 42. Also, one or more apparatus embodiments, method embodiments, or a combination thereof may be utilized during the component and subassembly manufacturing 36 and system integration 38, for example, by substantially expediting assembly of or reducing the cost of an aircraft 50. Similarly, one or more of apparatus embodiments, method embodiments, or a combination thereof may be utilized while the aircraft 50 is in service 42, for example and without limitation, to routine maintenance and service 44.

Figure 8:
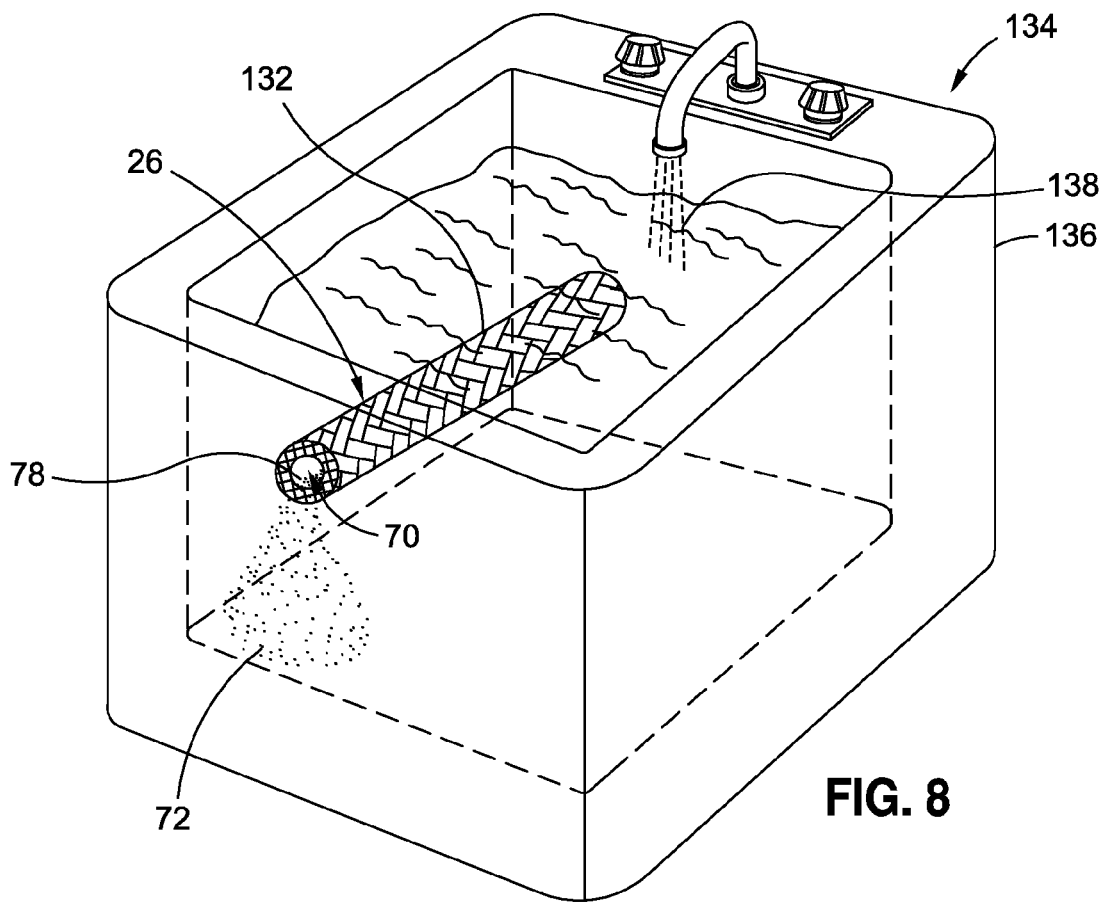
FIG. 8 is an illustration of a perspective view of a mandrel being washed out of the formed thermoplastic composite tubular structure in a mandrel removal apparatus that may be used in method embodiments of the disclosure.
Figure 9:
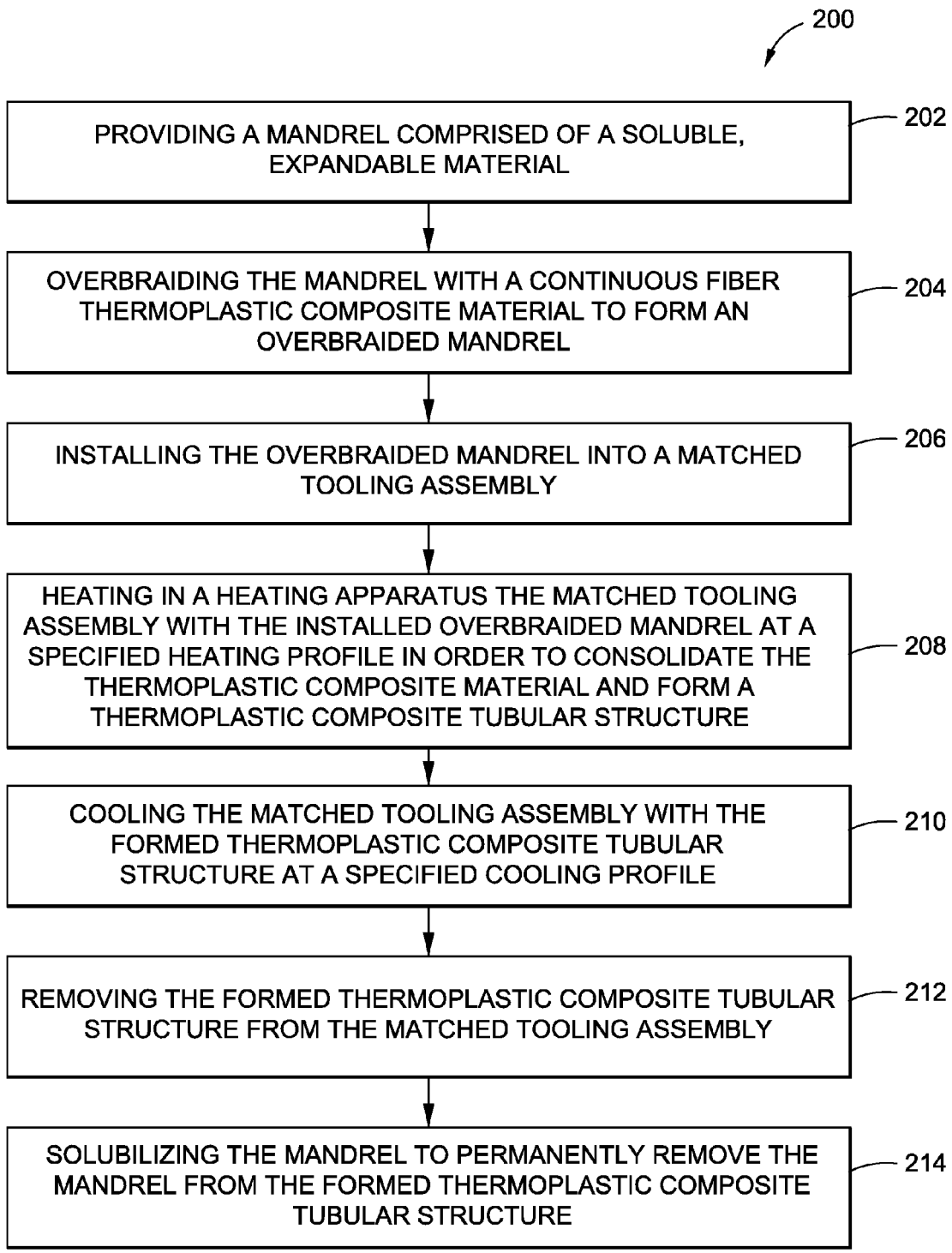
FIG. 9 is an illustration of a flow diagram illustrating one of the embodiments of a method of the disclosure.

In one embodiment of the disclosure, there is provided a method 200 of fabricating a thermoplastic composite tubular structure 26 (see FIGS. 1, 8). FIG. 9 is an illustration of a flow diagram illustrating the method 200 of the disclosure. For purposes of this application, the term "tubular structure" means a structure having a cylindrical or non-cylindrical shape, having a linear or non-linear shape in the lengthwise direction, and having a cross-section defining a closed geometric shape (discussed in detail below). The tubular structure may or may not be hollow or may be partially hollow.

As shown in FIG. 9, the method 200 comprises step 202 of providing a mandrel 70 or tooling (see FIG. 4A) comprised of a soluble, expandable material 72 (see FIGS. 4A, 4C). FIG. 4A is an illustration of a perspective view of one of the embodiments of the mandrel 70, such as in the form of mandrel 70a, that may be used in the method 200 (as well as in method 250 (see FIG. 10) and method 300 (see FIG. 11)), of the disclosure. FIG. 4C is an illustration of a perspective view of another one of the embodiments of the mandrel 70b that may be used in the method 200 of the disclosure. The mandrel 70 may thus, for example, be in the form of mandrel 70a (see FIG. 4A) or mandrel 70b (see FIG. 4C), or another suitable mandrel form. The mandrel 70 preferably comprises one or more soluble, expandable materials consisting of ceramic, sand, a polymer binder, a soluble organic binder, a soluble inorganic binder, sodium silicate, graphite, one or more additives, and one or more preservatives, or another suitable soluble, expandable material. Preferably, the mandrel material is a high expansion material. Embodiments of the mandrel or tooling that may be used in the disclosed methods include mandrels obtained from Advanced Ceramics Manufacturing, LLC, of Tucson, Ariz., and as disclosed in U.S. Published Patent Application Number 2010/0249303 A1, published Sep. 30, 2012, to Rossfeldt et al. and as disclosed in U.S. Published Patent Application Number 2011/0000398 A1, published Jan. 6, 2011, to Wallen et al., both assigned to Advanced Ceramics Manufacturing, LLC, of Tucson, Ariz., and incorporated herein by reference in their entireties.

Preferably, the mandrel 70 (see FIG. 4A) has a mandrel cross-section 74 (see FIG. 4B) defining a first closed geometric shape 76 (see FIG. 4B). FIG. 4B is an illustration of a cross-sectional view taken along lines 4B-4B of FIG. 4A. As shown in FIG. 4A, the mandrel 70, such as in the form of mandrel 70a, may comprise a cylindrical or tubular mandrel 78 having a linear shape 80. The tubular mandrel 78 has the mandrel cross-section 74 (see FIG. 4B), such as in the form of a mandrel cross-section 74a (see FIG. 4B), defining the first closed geometric shape 76 (see FIG. 4B), such as a first closed geometric shape 76a (see FIG. 4B), in the shape of a circle 82.

As shown in FIG. 4C, the mandrel 70b comprises a non-cylindrical mandrel 84 having a non-linear shape 86. FIG. 4D is an illustration of a cross-sectional view taken along lines 4D-4D of FIG. 4C. The non-cylindrical mandrel 84 has the mandrel cross-section 74, such as in the form of cross-section 74b (see FIG. 4D), defining the first closed geometric shape 76 at a first end 88 (see FIG. 4C), such as a first closed geometric shape 76b (see FIG. 4D), in the shape of a square 90 (see FIG. 4D). FIG. 4E is an illustration of a cross-sectional view taken along lines 4E-4E of FIG. 4C. The non-cylindrical mandrel 84 has the mandrel cross-section 74, such as in the form of cross-section 74c (see FIG. 4E), defining the first closed geometric shape 76 at a second end 92 (see FIG. 4C), such as a first closed geometric shape 76c (see FIG. 4E), in the shape of a rectangle 94 (see FIG. 4E).

In addition to the shapes of the circle 82 (see FIG. 4B) and the rectangle 94 (see FIG. 4E), the first closed geometric shape 76 may further include such shapes as a semi-circle, an oval, an ellipse, a parallelogram, a trapezoid, a rhombus, a curvilinear triangle, a crescent, a quadrilateral, a quatrefoil, and polygon shapes, in addition to the square 90 (see FIG. 4D), comprising a triangle, a pentagon, a hexagon, a heptagon, an octagon, a nonagon, a decagon, a hendecagon, a dodecagon, or another suitable closed geometric shape.

Figure 5A:
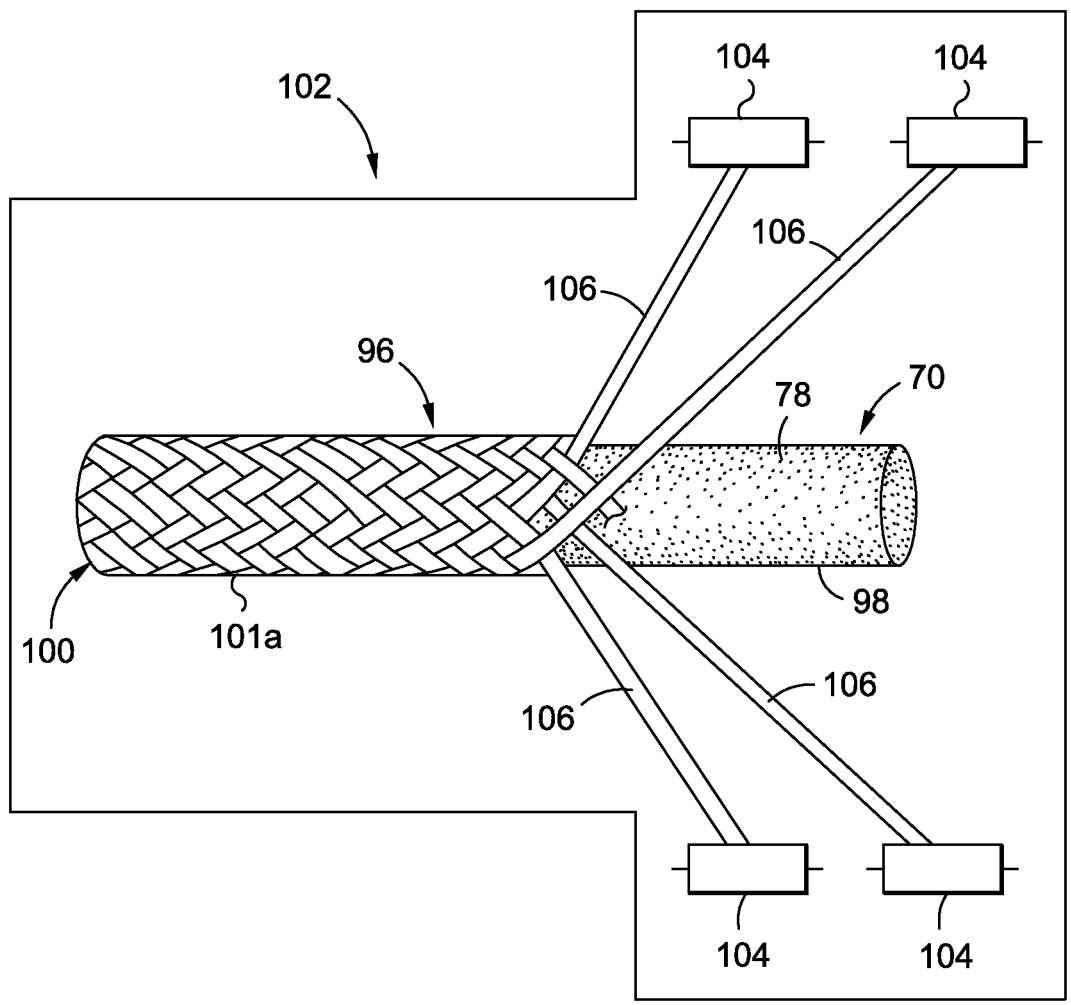
FIG. 5A is an illustration of a schematic top view of a braiding apparatus overbraiding one of the embodiments of a mandrel that may be used in method embodiments of the disclosure.

As shown in FIG. 9, the method 200 further comprises step 204 of overbraiding the mandrel 70 with a continuous fiber thermoplastic composite material 96 (see FIG. 5A) over an exterior surface 98 (see FIG. 5A) of the mandrel 70, such as in the form of the tubular mandrel 78, to form an overbraided mandrel 100 (see FIG. 5A). The use of the continuous fiber thermoplastic composite material 96 allows for preferred configurations or designs of the thermoplastic composite tubular structures 26 to be fabricated due to its ability to form structures in more complicated shapes.

The continuous fiber thermoplastic composite material 96 preferably consists of carbon fiber composite material; carbon fiber reinforced polymer material including carbon fiber reinforced polypheylene sulfide (PPS), carbon fiber reinforced polyetheretherketone (PEEK), carbon fiber reinforced polyetherketoneketone (PEKK), and carbon fiber reinforced polyethyleneimine (PEI); nylon, or another suitable thermoplastic composite material. The continuous fiber thermoplastic composite material 96 is preferably in a form consisting of a continuous slit tape thermoplastic composite material, a prepreg unidirectional tape 106 (see FIG. 5A), a prepreg fabric (not shown), a commingled fiber material (not shown), a quasi-isotropic or anisotropic continuous fiber thermoplastic composite material (not shown), or another suitable continuous fiber thermoplastic composite material. Preferably, the continuous fiber thermoplastic composite material 96, such as in the form of the prepreg unidirectional tape 106, has a narrow width of ⅛ inch wide, ¼ inch wide, or another suitably narrow width tape. The commingled fiber material may comprise dry fibers with a thermoplastic resin powder embedded in the dry fibers. The continuous fiber thermoplastic composite material 96 may be wound and/or braided around the mandrel in a zero (0) degree direction and also wound or braided in a bias direction. When the continuous fiber thermoplastic composite material 96 is wound or braided in a bias direction, the commingled fiber material may be used so that when the continuous fiber thermoplastic composite material 96 is heated and consolidated, the embedded resin powder fills the dry fibers and melts to result in the consolidated thermoplastic composite tubular structure 26.

For purposes of this application, "quasi-isotropic continuous fiber thermoplastic composite material" means a laminate that approximates isotropy by orientation of tows in several or more directions in-plane. For example, a quasi-isotropic part may have randomly oriented fibers in all directions or may have fibers oriented such that equal strength is developed all around the plane of the part. In general, a quasi-isotropic laminate made from a prepreg fabric or woven fabric may have tows oriented at 0° (zero degrees), 90°, +45°, and −45°, with at least 12.5% of the tows in each of these four directions. Quasi-isotropic properties may also be obtained with braided unidirectional (0 degree) and 60 degree bias oriented tows. For purposes of this application, "anisotropic continuous fiber thermoplastic composite material" means the composite material's directional dependence of a physical property and can be a difference, when measured along different axes, in a material's physical or mechanical properties (absorbance, refractive index, conductivity, tensile strength, etc.). Anisotropic may also be referred to as "unidirectional". The method 200 (as well as method 250 (see FIG. 10) and method 300 (see FIG. 11), provides for fabricating and configuration of highly loaded quasi-isotropic or highly loaded anisotropic (unidirectional) thermoplastic composite continuous fiber tubular structures manufactured with the use of soluble, expandable (high expansion) mandrels or tooling materials.

FIG. 5A is an illustration of a schematic top view of a braiding apparatus 102 for overbraiding one of the embodiments of a mandrel 70 that may be used in method embodiments of the disclosure. As shown in FIG. 5A, the overbraiding of the mandrel 70 is preferably accomplished by using the braiding apparatus 102 having one or more braiding bobbins or tubes 104 for dispensing and braiding the continuous fiber thermoplastic composite material 96 over the mandrel 70. A braiding apparatus or machine known in the art may be used to overbraid the mandrel. Preferably, the known braiding apparatus or machine has the capability of accommodating changes to the continuous fiber thermoplastic composite material's thickness, gauge, bias angle along the length, cross-sectional shape, cross-sectional angular path along the length, curve, shape of drop, and number of tows. Preferably, the overbraiding of the mandrel 70 is carried out at ambient temperature. The overbraiding process preferably provides for improved damage tolerance and improved fracture toughness properties of the continuous fiber thermoplastic composite material 96 due to the over and under construction of the overbraiding process. In one embodiment, as shown in FIG. 5A, the overbraided mandrel 100 may comprise a continuous fiber thermoplastic composite material 96 with a bias tow only overbraid 101a.

Figure 5B:
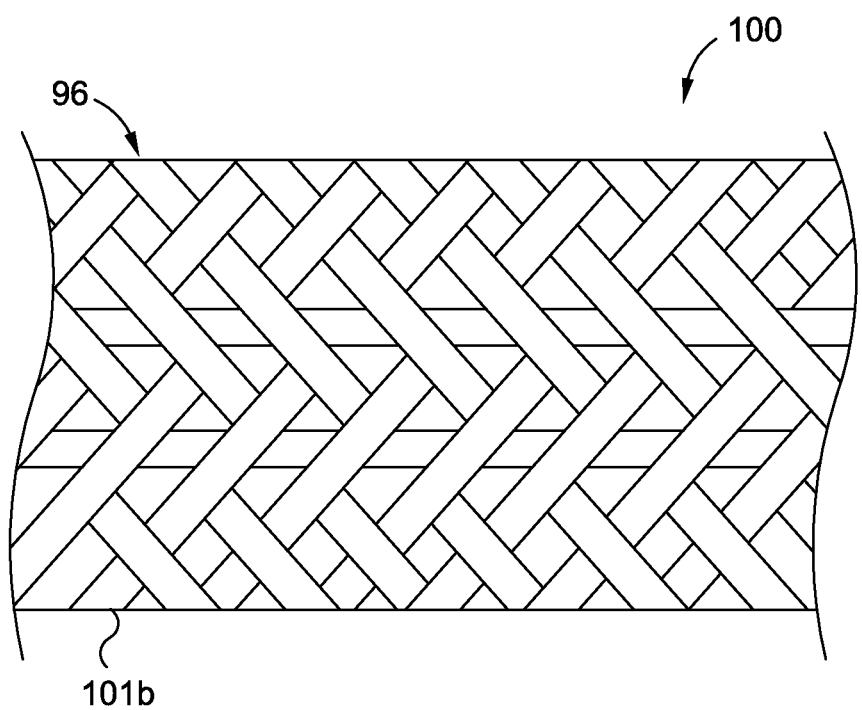
FIG. 5B is an illustration of a close-up top view of an overbraided mandrel with a triaxial overbraid that may be used in method embodiments of the disclosure.

In another embodiment, as shown in FIG. 5B, the overbraided mandrel 100 may comprise a continuous fiber thermoplastic composite material 96 with a triaxial overbraid 101b. FIG. 5B is an illustration of a close-up top view of the overbraided mandrel 100 with the triaxial overbraid 101b that may be used in method embodiments of the disclosure.

The overbraided mandrel 100 preferably has an overbraided mandrel cross-section 105 (see FIG. 6A) defining a second closed geometric shape 107 (see FIG. 6A). Preferably, the second closed geometric shape 107 of the overbraided mandrel cross-section 105 corresponds in shape to the first closed geometric shape 76 of the mandrel cross-section 74 of the mandrel 70. For example, the second closed geometric shape 17 is in the shape of a larger circle that corresponds to the shape of the circle 82 (see FIG. 4B) of the mandrel cross-section 74a (see FIG. 4B) of the tubular mandrel 78. The second closed geometric shape 107 may include such shapes as a circle, a rectangle, a semi-circle, an oval, an ellipse, a parallelogram, a trapezoid, a rhombus, a curvilinear triangle, a crescent, a quadrilateral, a quatrefoil, and polygon shapes, such as a triangle, a square, a pentagon, a hexagon, a heptagon, an octagon, a nonagon, a decagon, a hendecagon, a dodecagon, or another suitable closed geometric shape.

As shown in FIG. 9, the method 200 further comprises step 206 of installing the overbraided mandrel 100 (see FIGS. 6A-6B) into a matched tooling assembly 108 (see FIGS. 6A-6B). FIG. 6A is an illustration of an exploded perspective view of the overbraided mandrel 100 and the matched tooling assembly 108 that may be used in embodiments of the method 200 (as well as in method 250 (see FIG. 10) and method 300 (see FIG. 11)), of the disclosure. FIG. FIG. 6B is an illustration of a cross-sectional view taken along lines 6B-6B of FIG. 6A showing the overbraided mandrel 100 of FIG. 6A installed in the matched tooling assembly 108 of FIG. 6A. The matched tooling assembly 108 preferably comprises a metallic clamshell tooling assembly 110 (see FIG. 6B), such as made from steel, stainless steel, or another suitable metal.

Figure 7:
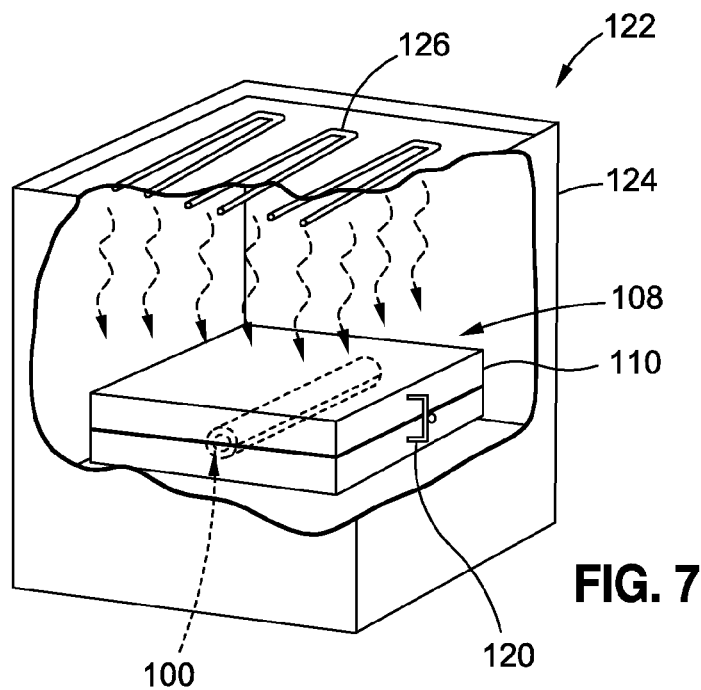
FIG. 7 is an illustration of a cut-away perspective view of an overbraided mandrel installed in a matched tooling assembly being heated in a heating apparatus that may be used in method embodiments of the disclosure.

As shown in FIG. 6A, the matched tooling assembly 108 preferably comprises a first portion 112 having a first portion mold side 114 and comprises a second portion 116 having a second portion mold side 118. The overbraided mandrel 100 may be installed within and between the first portion mold side 114 and the second portion mold side 118. As shown in FIG. 7, once the matched tooling assembly 108 is closed around the overbraided mandrel 100, the first portion 112 and the second portion 116 of the matched tooling assembly 108 may be held together via a holding element 120, such as a clamp or other suitable device.

As shown in FIG. 9, the method 200 further comprises step 208 of heating in a heating apparatus 122 the matched tooling assembly 108 with the installed overbraided mandrel 100 at a specified heating profile in order to consolidate the continuous fiber thermoplastic composite material 96 and form a thermoplastic composite tubular structure 26 (see FIG. 8). FIG. 7 is an illustration of a cut-away perspective view of the overbraided mandrel 100 installed in the matched tooling assembly 108, such as in the form of the clamshell metallic tooling assembly 110, being heated in the heating apparatus 122 that may be used in the method 200 (as well as in method 250 (see FIG. 10) and method 300 (see FIG. 11)) of the disclosure.

As shown in FIG. 7, the heating apparatus 122 comprises a convection oven 124 having heating elements 126 that emit heat 128 in order to consolidate the continuous fiber thermoplastic composite material 96. The method 200 may allow for fabrication of thermoplastic composite tubular structures 26 in a completely out of autoclave fabrication method by applying pressure internally using the expandable material 72 of the mandrel 70. However, although a convection oven 124 is shown in FIG. 7, the heating apparatus 122 may also consist of an induction oven, an induction heated matched tooling assembly, an autoclave, an integrally heated tooling assembly, or another suitable heating apparatus. Preferably, the specified heating profile comprises a heating temperature in a range of from about 150 degrees Fahrenheit to about 800 degrees Fahrenheit. More preferably, the heating temperature is in a range of from about 400 degrees Fahrenheit to about 750 degrees Fahrenheit. Most preferably, the heating temperature is in a range of from about 550 degrees Fahrenheit to about 700 degrees Fahrenheit. Preferably, the specified heating profile comprises a heating time in a range of from about 5 minutes to about 120 minutes. More preferably, the heating time is in a range of from about 10 minutes to about 60 minutes.

Upon heating in the heating apparatus 122 (see FIG. 7), the expandable material 72 (see FIG. 4A) of the mandrel 70 (see FIG. 4A) preferably expands and exerts pressure on the continuous fiber thermoplastic composite material 96 (see FIG. 5A) against the matched tooling assembly 108 causing consolidation or hardening of the continuous fiber thermoplastic composite material 96 to form the thermoplastic composite tubular structure 26. As used herein, the terms "consolidate" or "consolidation" mean hardening or toughening of the thermoplastic composite material under heat and/or pressure to form a unitary structure, e.g., thermoplastic composite tubular structure, and cooling of the hardened or toughened unitary structure. Heating methods may include induction, microwave, ultrasonic, resistance, hot jet, laser, autoclave, plasma, or another suitable heating method, and pressurizing techniques may include mold, contact, fiber tension, roller, vacuum bagging or another suitable pressurizing technique. During consolidation, the heat and/or pressure results in flow of resin and wetting of reinforcing fibers of the thermoplastic composite material. Preferably, the pressure exerted by the mandrel on the continuous fiber thermoplastic composite material 96 may be in a range of from about 100 psi (pounds per square inch) to about 400 psi. In addition, by providing a metallic clamshell tooling assembly 110 with smooth, polished surfaces, where pressure is being generated from the inside out, any wrinkles or deformations on the outside of the consolidated or hardened formed thermoplastic composite tubular structure 26 may be avoided or minimized.

As shown in FIG. 9, the method 200 further comprises step 210 of cooling the matched tooling assembly 108 with the formed thermoplastic composite tubular structure 26 at a specified cooling profile. The specified cooling profile preferably comprises a temperature below a glass transition temperature of the continuous fiber thermoplastic composite material 96 forming the overbraided mandrel 100. As shown in FIG. 9, the method 200 further comprises step 212 of removing the formed thermoplastic composite tubular structure 26 (see FIG. 8) from the matched tooling assembly 108.

As shown in FIG. 9, the method 200 further comprises step 214 of solubilizing the mandrel 70 to permanently remove the mandrel 70 from the formed thermoplastic composite tubular structure 26. FIG. 8 is an illustration of a perspective view of the mandrel 70 being washed out of the formed thermoplastic composite tubular structure 26 in a mandrel removal apparatus 134 that may be used in the method 200 (as well as in method 250 (see FIG. 10) and method 300 (see FIG. 11)) of the disclosure. As shown in FIG. 8, the mandrel removal apparatus 134 may comprise a washing vessel 136, such as a sink, that dispenses water 138 or another water-based solution to wash out and to permanently remove the mandrel 70, such as in the form of the tubular mandrel 78, from the formed thermoplastic composite tubular structure 26, such as in the form of a thermoplastic composite tube 132. Solubilizing the mandrel 70 thus further comprises solubilizing the mandrel 70 with water 138 or a water-based solution to permanently remove the mandrel 70 from the formed thermoplastic composite tubular structure 26. The mandrel 70 may be solubilized and washed out of the formed thermoplastic composite tubular structure 26 in pieces or portions of the soluble, expandable material 72 that forms the mandrel 70. The removed mandrel 70 or soluble, expandable material 72 may be discarded or recycled. In another embodiment of the disclosure, there is provided a thermoplastic composite tubular structure 26 (see FIG. 8) fabricated by the method 200 discussed above. The thermoplastic composite tubular structure 26 may comprise a thermoplastic composite tube 132 (see FIG. 8), a pipe, a duct, an elongate hollow structure, or another suitable thermoplastic composite tubular structure 26, and may be cylindrical or non-cylindrical and may be linear or non-linear.

Figure 10:
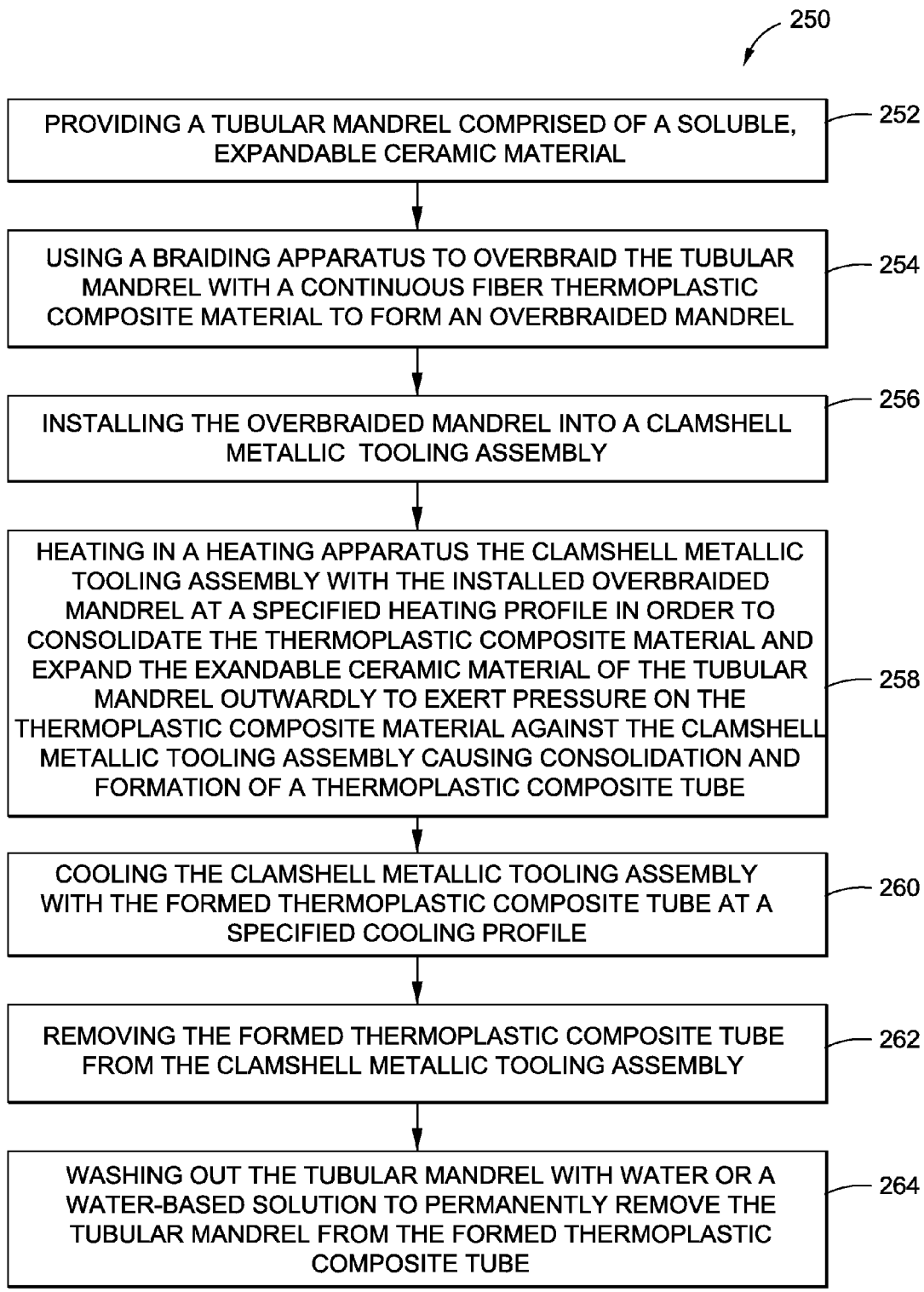
FIG. 10 is an illustration of a flow diagram illustrating another one of the embodiments of a method of the disclosure; and, FIG. 11 is an illustration of a flow diagram illustrating another one of the embodiments of a method of the disclosure.

In another embodiment of the disclosure, there is provided a method 250 of fabricating thermoplastic composite tubing 132 (see FIG. 8). FIG. 10 is an illustration of a flow diagram illustrating the method 250 of the disclosure. As shown in FIG. 10, the method 250 comprises step 252 of providing a tubular mandrel 78 (see FIG. 4A) comprised of a soluble, expandable ceramic material 72 (see FIG. 4A). The tubular mandrel 78 preferably comprises one or more soluble, expandable materials consisting of ceramic, sand, a polymer binder, a soluble organic binder, a soluble inorganic binder, sodium silicate, graphite, one or more additives, and one or more preservatives, or another suitable soluble, expandable material.

As shown in FIG. 10, the method 250 further comprises step 254 of using a braiding apparatus 102 (see FIG. 5A) to overbraid the tubular mandrel 78 (see FIG. 4A) with a continuous fiber thermoplastic composite material 96 (see FIG. 5A) to form an overbraided mandrel 100 (see FIG. 5A). As discussed above, the continuous fiber thermoplastic composite material 96 preferably consists of carbon fiber composite material; carbon fiber reinforced polymer material including carbon fiber reinforced polypheylene sulfide (PPS), carbon fiber reinforced polyetheretherketone (PEEK), carbon fiber reinforced polyetherketoneketone (PEKK), and carbon fiber reinforced polyethyleneimine (PEI); nylon, or another suitable thermoplastic composite material. As shown in FIG. 5A, the braiding apparatus 102 has one or more braiding bobbins or tubes 104 for dispensing and braiding the continuous fiber thermoplastic composite material 96 over the tubular mandrel 78. The continuous fiber thermoplastic composite material 96 preferably consists of a continuous slit tape thermoplastic composite material, a prepreg unidirectional tape 106 (see FIG. 5A), a prepreg fabric (not shown), a commingled fiber material (not shown), a quasi-isotropic or anisotropic continuous fiber thermoplastic composite material (not shown), or another suitable continuous fiber thermoplastic composite material.

As shown in FIG. 10, the method 250 further comprises step 256 of installing the overbraided mandrel 100 (see FIG. 6B) into a clamshell metallic tooling assembly 110 (see FIG. 6B). As shown in FIG. 6B, the clamshell metallic tooling assembly 110 preferably comprises the first portion 112 and the second portion 116 that may be held together around the overbraided mandrel 100 via the holding element 120, such as a clamp or other suitable device.

As shown in FIG. 10, the method 250 further comprises step 258 of heating in the heating apparatus 122 (see FIG. 7) the clamshell metallic tooling assembly 110 (see FIG. 7) with the installed overbraided mandrel 100 (see FIG. 7) at a specified heating profile in order to consolidate the continuous fiber thermoplastic composite material 96 (see FIG. 5A). Upon heating, the expandable ceramic material of the tubular mandrel 78 (see FIG. 4A) expands outwardly to exert pressure on the continuous fiber thermoplastic composite material 96 against the clamshell metallic tooling assembly 110 causing consolidation and formation of a thermoplastic composite tube 132 (see FIG. 8).

As shown in FIG. 7, the overbraided mandrel 100 installed in the clamshell metallic tooling assembly 110 is being heated in the heating apparatus 122 that may be used in the method 250 of the disclosure. As shown in FIG. 7 and discussed above, the heating apparatus 122 may comprise the convection oven 124 having heating elements 126 that emit heat 128 in order to consolidate the continuous fiber thermoplastic composite material 96. Although the convection oven 124 is shown in FIG. 7, the heating apparatus 122 may also preferably consist of an autoclave, an induction oven, an induction heated matched tooling assembly, an integrally heated tooling assembly, or another suitable heating apparatus. Preferably, the specified heating profile comprises a heating temperature in a range of from about 150 degrees Fahrenheit to about 800 degrees Fahrenheit. More preferably, the heating temperature is in a range of from about 400 degrees Fahrenheit to about 750 degrees Fahrenheit. Most preferably, the heating temperature is in a range of from about 550 degrees Fahrenheit to about 700 degrees Fahrenheit. Preferably, the specified heating profile comprises a heating time in a range of from about 5 minutes to about 120 minutes. More preferably, the heating time is in a range of from about 10 minutes to about 60 minutes.

As shown in FIG. 10, the method 250 further comprises step 260 of cooling the clamshell metallic tooling assembly 110 with the formed thermoplastic composite tube 132 (see FIG. 8) at a specified cooling profile. As discussed above, the specified cooling profile preferably comprises a temperature below a glass transition temperature of the continuous fiber thermoplastic composite material 96 (see FIG. 5A) forming the overbraided mandrel 100 (see FIG. 5A). As shown in FIG. 10, the method 250 further comprises step 262 of removing the formed thermoplastic composite tube 132 (see FIG. 8) from the clamshell metallic tooling assembly 110 (see FIG. 7).

As shown in FIG. 10, the method 250 further comprises step 264 of washing out the tubular mandrel 78 (see FIG. 8) with water 138 (see FIG. 8) or a water-based solution to permanently remove the tubular mandrel 78 from the formed thermoplastic composite tube 132 (see FIG. 8). The removed tubular mandrel 78 or soluble, expandable material 72 may be discarded or recycled. In another embodiment of the disclosure, there is provided a thermoplastic composite tube 132 (see FIG. 8) formed by the method 250 discussed above. The thermoplastic composite tube 132 may be linear or non-linear.

Figure 11:
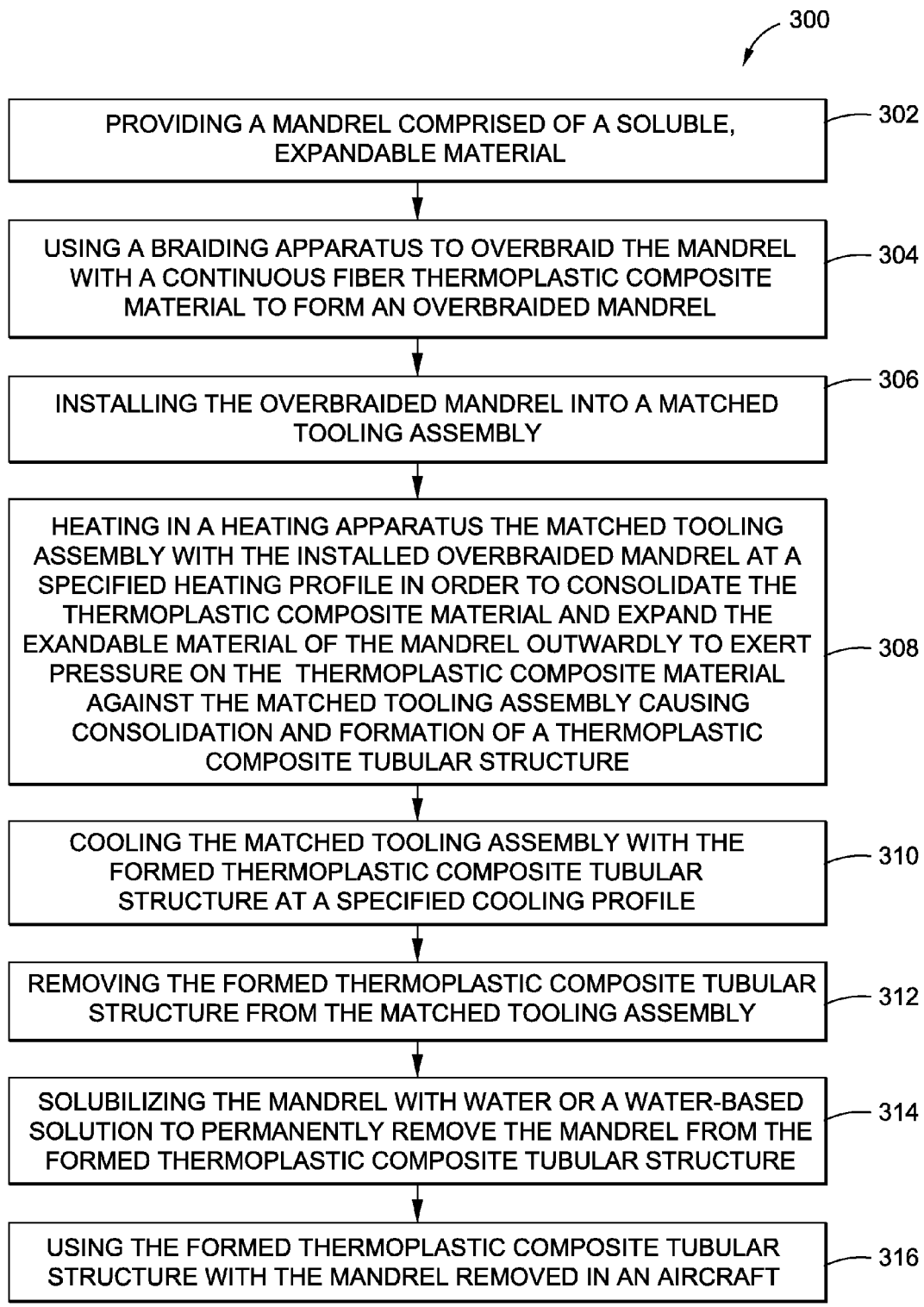

In another embodiment of the disclosure, there is provided a method 300 of fabricating an aircraft thermoplastic composite tubular structure 28 (see FIG. 1). FIG. 11 is an illustration of a flow diagram illustrating the method 300 of the disclosure. The method 300 comprises step 302 of providing a mandrel 70 (see FIG. 4A) comprised of a soluble, expandable material 72 (see FIG. 4A). The mandrel 70 may, for example, be in the form of mandrel 70a (see FIG. 4A) or mandrel 70b (see FIG. 4C), or another suitable mandrel form. The mandrel 70 preferably comprises one or more soluble, expandable materials consisting of ceramic, sand, a polymer binder, a soluble organic binder, a soluble inorganic binder, sodium silicate, graphite, one or more additives, and one or more preservatives, or another suitable soluble, expandable material.

As discussed above, preferably, the mandrel 70 has the mandrel cross-section 74 (see FIG. 4B) defining the first closed geometric shape 76 (see FIG. 4B). In addition to the shapes of the circle 82 (see FIG. 4B) and the rectangle 94 (see FIG. 4E), the first closed geometric shape 76 may further include such shapes as a semi-circle, an oval, an ellipse, a parallelogram, a trapezoid, a rhombus, a curvilinear triangle, a crescent, a quadrilateral, a quatrefoil, and polygon shapes, in addition to the square 90, comprising a triangle, a pentagon, a hexagon, a heptagon, an octagon, a nonagon, a decagon, a hendecagon, a dodecagon, or another suitable closed geometric shape.

As shown in FIG. 11, the method 300 further comprises step 304 of using the braiding apparatus 102 (see FIG. 5A) to overbraid the mandrel 70 with the continuous fiber thermoplastic composite material 96 (see FIG. 5A) to form the overbraided mandrel 100 (see FIG. 5A). As discussed above, the continuous fiber thermoplastic composite material 96 preferably consists of carbon fiber composite material; carbon fiber reinforced polymer material including carbon fiber reinforced polypheylene sulfide (PPS), carbon fiber reinforced polyetheretherketone (PEEK), carbon fiber reinforced polyetherketoneketone (PEKK), and carbon fiber reinforced polyethyleneimine (PEI); nylon, or another suitable thermoplastic composite material. The continuous fiber thermoplastic composite material 96 preferably consists of a continuous slit tape thermoplastic composite material, a prepreg unidirectional tape 106 (see FIG. 5A), a prepreg fabric (not shown), a commingled fiber material (not shown), a quasi-isotropic or anisotropic continuous fiber thermoplastic composite material (not shown), or another suitable continuous fiber thermoplastic composite material.

The overbraided mandrel 100 preferably has the overbraided mandrel cross-section 105 (see FIG. 6A) defining the second closed geometric shape 107 (see FIG. 6A). As discussed above, preferably, the second closed geometric shape 107 of the overbraided mandrel cross-section 105 corresponds in shape to the first closed geometric shape 76 of the mandrel cross-section 74 of the mandrel 70. The second closed geometric shape 107 may include such shapes as a circle, a rectangle, a semi-circle, an oval, an ellipse, a parallelogram, a trapezoid, a rhombus, a curvilinear triangle, a crescent, a quadrilateral, a quatrefoil, and polygon shapes, such as a triangle, a square, a pentagon, a hexagon, a heptagon, an octagon, a nonagon, a decagon, a hendecagon, a dodecagon, or another suitable closed geometric shape.

As shown in FIG. 11, the method 300 further comprises step 306 of installing the overbraided mandrel 100 (see FIG. 6B) into the matched tooling assembly 108 (see FIG. 6B). The matched tooling assembly 108 preferably comprises a metallic clamshell tooling assembly 110 (see FIG. 6B). As shown in FIG. 6B, once the matched tooling assembly 108 is closed around the overbraided mandrel 100, the first portion 112 and the second portion 116 of the matched tooling assembly 108 may be held together via a holding element 120, such as a clamp or other suitable device.

As shown in FIG. 11, the method 300 further comprises step 308 of heating in the heating apparatus 122 (see FIG. 7) the matched tooling assembly 108 (see FIG. 7) with the installed overbraided mandrel 100 (see FIG. 7) at a specified heating profile in order to consolidate the continuous fiber thermoplastic composite material 96 (see FIG. 5A). Upon heating in the heating apparatus 122 (see FIG. 7), the expandable material 72 (see FIG. 4A) of the mandrel 70 (see FIG. 4A) preferably expands and exerts a pressure on the continuous fiber thermoplastic composite material 96 (see FIG. 5A) against the matched tooling assembly 108 causing consolidation or hardening of the continuous fiber thermoplastic composite material 96.

As discussed above, the heating apparatus 122 may comprise a convection oven 124 (see FIG. 7) having heating elements 126 that emit heat 128 in order to consolidate the continuous fiber thermoplastic composite material 96, or the heating apparatus 122 may also comprise an autoclave, an induction oven, an induction heated matched tooling assembly, an integrally heated tooling assembly, or another suitable heating apparatus. Preferably, the specified heating profile comprises a heating temperature in a range of from about 150 degrees Fahrenheit to about 800 degrees Fahrenheit. More preferably, the heating temperature is in a range of from about 400 degrees Fahrenheit to about 750 degrees Fahrenheit. Most preferably, the heating temperature is in a range of from about 550 degrees Fahrenheit to about 700 degrees Fahrenheit. Preferably, the specified heating profile comprises a heating time in a range of from about 5 minutes to about 120 minutes. More preferably, the heating time is in a range of from about 10 minutes to about 60 minutes.

As shown in FIG. 11, the method 300 further comprises step 310 of cooling the matched tooling assembly 108 with the formed thermoplastic composite tubular structure 26 at a specified cooling profile. The specified cooling profile preferably comprises a temperature below a glass transition temperature of the continuous fiber thermoplastic composite material 96 forming the overbraided mandrel 100. As shown in FIG. 11, the method 300 further comprises step 312 of removing the formed thermoplastic composite tubular structure 26 from the matched tooling assembly 108 (see FIG. 7).

As shown in FIG. 11, the method 300 further comprises step 314 of solubilizing the mandrel 70 (see FIG. 8) with water 138 (see FIG. 8) or a water-based solution to permanently remove the mandrel 70 from the formed thermoplastic composite tubular structure 26 (see FIG. 8). As shown in FIG. 11, the method 300 further comprises using the formed thermoplastic composite tubular structure 26 with the mandrel 70 removed in an aircraft 10 (see FIG. 1). The removed mandrel 70 or soluble, expandable material 72 may be discarded or recycled. In another embodiment of the disclosure, there is provided an aircraft thermoplastic composite tubular structure 28 (see FIG. 1) formed by the method 300 discussed above. The aircraft thermoplastic composite tubular structure 28 may comprise a thermoplastic composite tube 132 (see FIG. 8), a pipe, a duct, an elongate hollow structure, or another suitable aircraft thermoplastic composite tubular structure 26, and may be cylindrical or non-cylindrical and may be linear or non-linear.

Disclosed embodiments of the method 200, method 250, method 300, thermoplastic composite tubular structure 26, and thermoplastic composite tube 132 may, as compared to existing methods and structures, provide decreased manufacturing time and decreased material costs, which, in turn, may result in decreased overall manufacturing costs; provide for decreased weight of the aircraft, which, in turn, may result in decreased fuel costs during aircraft flight and improved weight competitiveness; alleviate or mitigate corrosion and electromagnetic issues of known metal materials; and provide thermoplastic composite tubular structures with high strength, high performance, improved fracture toughness properties, and improved damage tolerance. Further, disclosed embodiments of the method 200, method 250, method 300, thermoplastic composite tubular structure 26, and thermoplastic composite tube 132 provide for the rapid fabrication of highly loaded thermoplastic composite quasi-isotropic or anisotropic continuous fiber tubular shapes using soluble, high expansion mandrels or tooling, and provide for the rapid fabrication of continuous fiber thermoplastic composite tubular structures, in particular, with high performance, high strength, thermoplastic composite materials, such as PEEK and PEKK. This allows for fabrication of thermoplastic composite tubular structure 26 in a completely out of autoclave fabrication method by applying pressure internally using the expandable material of the mandrel or tooling. Additionally, the mandrel is soluble and may be permanently removed by simply washing out the mandrel or tooling with water or water based solutions.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A method of fabricating a thermoplastic composite tubular structure, the method comprising:
   using a braiding apparatus to overbraid a single mandrel with a continuous fiber thermoplastic composite material to form an overbraided mandrel, the mandrel comprising a soluble, expandable material, the continuous fiber thermoplastic composite material consisting of a continuous slit tape thermoplastic composite material, and having a mandrel cross-section defining a first closed geometric shape, and the overbraided mandrel having an overbraided mandrel cross-section defining a second closed geometric shape that corresponds to the first closed geometric shape of the mandrel cross-section;
   installing the overbraided mandrel into a metallic clamshell tooling assembly;
   heating in a heating apparatus the metallic clamshell tooling assembly with the installed overbraided mandrel at a specified heating profile, and generating pressure from inside the installed overbraided mandrel out to the metallic clamshell tooling assembly, in order to consolidate the continuous fiber thermoplastic composite material and form a thermoplastic composite tubular structure, wherein the heating apparatus is selected from the group consisting of a convection oven, an induction oven, an autoclave, and an integrally heated tooling assembly, and wherein the pressure is in a range of from about 100 psi (pounds per square inch) to about 400 psi;
   cooling the metallic clamshell tooling assembly with the formed thermoplastic composite tubular structure at a specified cooling profile;
   removing the formed thermoplastic composite tubular structure from the metallic clamshell tooling assembly; and, solubilizing the mandrel to permanently remove the mandrel from the formed thermoplastic composite tubular structure.

2. The method of claim 1 wherein the soluble, expandable material of the mandrel is selected from the group consisting of one or more of ceramic, sand, a polymer binder, a soluble organic binder, a soluble inorganic binder, sodium silicate, graphite, one or more additives, and one or more preservatives.

3. The method of claim 1 wherein the first closed geometric shape and the corresponding second closed geometric shape are each selected from the group consisting of a circle, a semi-circle, a rectangle, an oval, an ellipse, a parallelogram, a trapezoid, a rhombus, a curvilinear triangle, a crescent, a quadrilateral, a quatrefoil, and a polygon comprising a triangle, a square, a pentagon, a hexagon, a heptagon, an octagon, a nonagon, a decagon, a hendecagon, and a dodecagon.

4. The method of claim 1 wherein the continuous fiber thermoplastic composite material is a material selected from the group consisting of carbon fiber composite material; carbon fiber reinforced polymer material including carbon fiber reinforced polyphenylene sulfide (PPS), carbon fiber reinforced polyetheretherketone (PEEK), carbon fiber reinforced polyetherketoneketone (PEKK), and carbon fiber reinforced polyethyleneimine (PEI); and nylon.

5. The method of claim 1 wherein the specified heating profile comprises a heating temperature in a range of from about 150 degrees Fahrenheit to about 800 degrees Fahrenheit and a heating time in a range of from about 5 minutes to about 120 minutes.

6. The method of claim 1 wherein upon heating in the heating apparatus, the expandable material of the mandrel expands and exerts pressure on the continuous fiber thermoplastic composite material against the metallic clamshell tooling assembly causing consolidation of the continuous fiber thermoplastic composite material.

7. The method of claim 1 wherein the specified cooling profile comprises a temperature below a glass transition temperature of the thermoplastic composite material forming the overbraided mandrel.

8. The method of claim 1 wherein solubilizing the mandrel further comprises solubilizing the mandrel with water or a water-based solution to permanently remove the mandrel from the formed thermoplastic composite tubular structure.

9. A method of fabricating thermoplastic composite tubing, the method comprising:
using a braiding apparatus to overbraid a single tubular mandrel with a continuous fiber thermoplastic composite material to form an overbraided mandrel, the tubular mandrel comprising a soluble, expandable ceramic material, the continuous fiber thermoplastic composite material consisting of a continuous slit tape thermoplastic composite material;
installing the overbraided mandrel into a clamshell metallic tooling assembly;
heating in a heating apparatus the clamshell metallic tooling assembly with the installed overbraided mandrel at a specified heating profile in order to consolidate the continuous fiber thermoplastic composite material and expand the expandable ceramic material of the tubular mandrel outwardly to exert pressure on the continuous fiber thermoplastic composite material against the clamshell metallic tooling assembly causing consolidation and formation of a thermoplastic composite tube, and wherein the pressure is in a range of from about 100 psi (pounds per square inch) to about 400 psi, wherein the heating apparatus is selected from the group consisting of a convection oven, an induction oven, an autoclave, and an integrally heated tooling assembly;
cooling the clamshell metallic tooling assembly with the formed thermoplastic composite tube at a specified cooling profile;
removing the formed thermoplastic composite tube from the clamshell metallic tooling assembly; and,
washing out the tubular mandrel with water or a water-based solution to permanently remove the tubular mandrel from the formed thermoplastic composite tube.

10. The method of claim 9 wherein the continuous fiber thermoplastic composite material is a material selected from the group consisting of carbon fiber composite material; carbon fiber reinforced polymer material including carbon fiber reinforced polyphenylene sulfide (PPS), carbon fiber reinforced polyetheretherketone (PEEK), carbon fiber reinforced polyetherketoneketone (PEKK), and carbon fiber reinforced polyethyleneimine (PEI); and nylon.

11. The method of claim 9 wherein the specified heating profile comprises a heating temperature in a range of from about 150 degrees Fahrenheit to about 800 degrees Fahrenheit and a heating time in a range of from about 5 minutes to about 120 minutes.

12. A method of fabricating an aircraft thermoplastic composite tubular structure, the method comprising:
providing a mandrel comprised of a soluble, expandable material, the mandrel having a mandrel cross-section defining a first closed geometric shape;
using a braiding apparatus to overbraid a single mandrel with a continuous fiber thermoplastic composite material to form an overbraided mandrel, the mandrel comprising a soluble, expandable material and having a mandrel cross-section defining a first closed geometric shape, the continuous fiber thermoplastic composite material consisting of a continuous slit tape thermoplastic composite material;
the overbraided mandrel having an overbraided mandrel cross-section defining a second closed geometric shape that corresponds to the first closed geometric shape of the mandrel cross-section;
installing the overbraided mandrel into a metallic clamshell tooling assembly;
heating in a heating apparatus the metallic clamshell tooling assembly with the installed overbraided mandrel at a specified heating profile in order to consolidate the continuous fiber thermoplastic composite material and expand the expandable material of the mandrel outwardly to exert pressure on the continuous fiber thermoplastic composite material against the metallic clamshell tooling assembly causing consolidation and formation of a thermoplastic composite tubular structure, and wherein the pressure is in a range of from about 100 psi (pounds per square inch) to about 400 psi, wherein the heating apparatus is selected from the group consisting of a convection oven, an induction oven, an autoclave, and an integrally heated tooling assembly;
cooling the metallic clamshell tooling assembly with the formed thermoplastic composite structure at a specified cooling profile;
removing the formed thermoplastic composite tubular structure from the metallic clamshell tooling assembly;
solubilizing the mandrel with water or a water-based solution to permanently remove the mandrel from the formed thermoplastic composite tubular structure; and,
using the formed thermoplastic composite tubular structure with the mandrel removed in an aircraft.

13. The method of claim 12 wherein the soluble, expandable material of the mandrel is selected from the group consisting of one or more of ceramic, sand, a polymer binder, a soluble organic binder, a soluble inorganic binder, sodium silicate, graphite, one or more additives, and one or more preservatives.

14. The method of claim 12 wherein the continuous fiber thermoplastic composite material is a material selected from the group consisting of carbon fiber composite material; carbon fiber reinforced polymer material including carbon fiber reinforced polyphenylene sulfide (PPS), carbon fiber reinforced polyetheretherketone (PEEK), carbon fiber reinforced polyetherketoneketone (PEKK), and carbon fiber reinforced polyethyleneimine (PEI); and nylon.

15. The method of claim 12 wherein the specified heating profile comprises a heating temperature in a range of from about 150 degrees Fahrenheit to about 800 degrees Fahrenheit and a heating time in a range of from about 5 minutes to about 120 minutes.

\* \* \* \* \*